Aug. 7, 1962 L. W. PARKER 3,048,841
REMOTE POSITION INDICATOR AND AIRCRAFT GUIDANCE SYSTEM
Filed Jan. 13, 1958 2 Sheets-Sheet 1
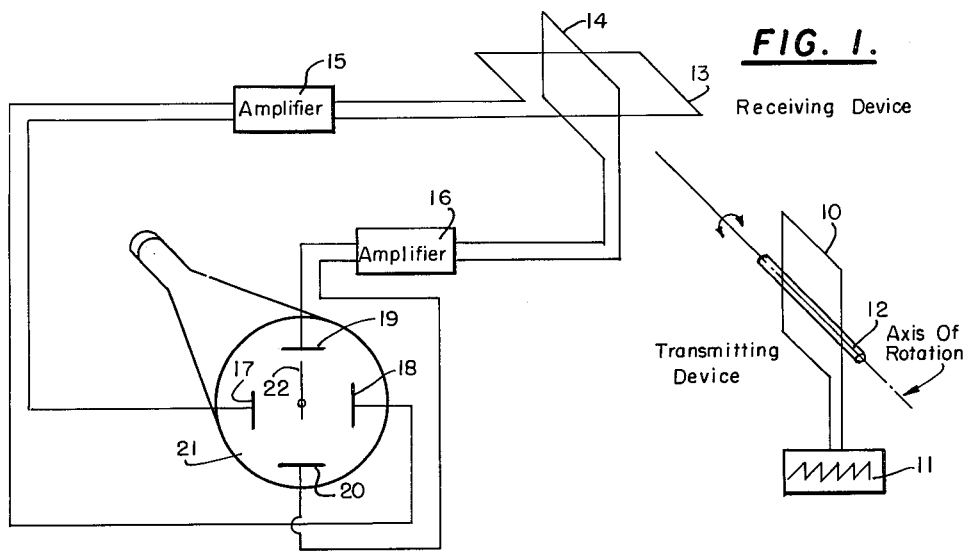
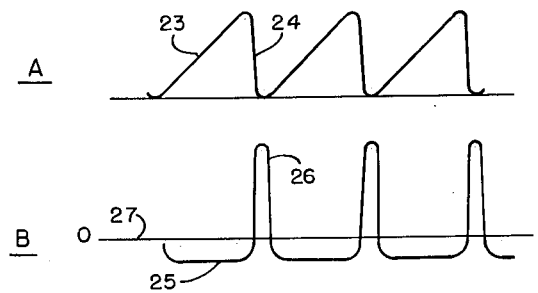
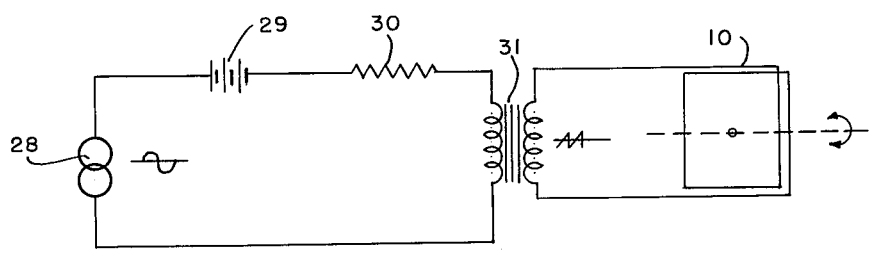
INVENTOR
Louis W. Parker
BY
ATTORNEYS Aug. 7, 1962 L. W. PARKER 3,048,841
REMOTE POSITION INDICATOR AND AIRCRAFT GUIDANCE SYSTEM
Filed Jan. 13, 1958 2 Sheets-Sheet 2
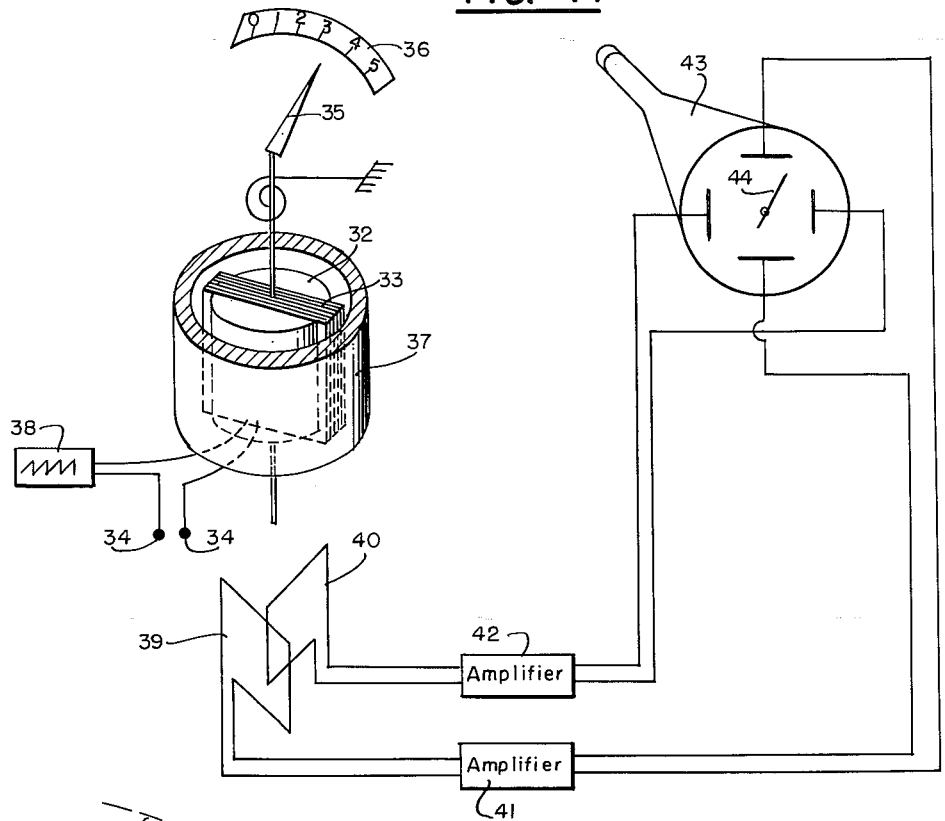
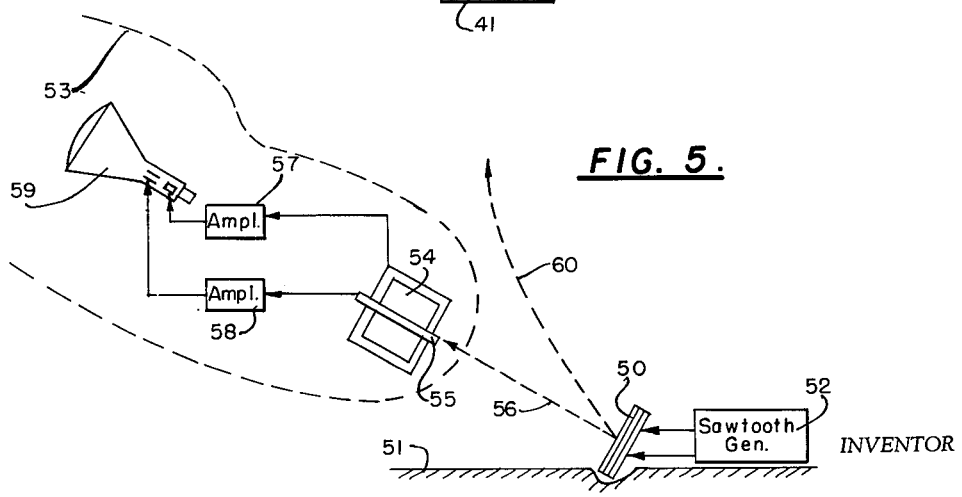
INVENTOR
Louis W. Parker
BY Moore & Hall
ATTORNEYS / 3,048,841
REMOTE POSITION INDICATOR AND
AIRCRAFT GUIDANCE SYSTEM
Louis W. Parker, 28 Polo Road, Great Neck, N.Y.
Filed Jan. 13, 1958, Ser. No. 708,516
5 Claims. (Cl. 343—101)

The present invention relates to metering and indicating devices, particularly of the type adapted to give a remote position indication of the angular position of an object being monitored; and is concerned with remote position indicators adapted to give an accurate sense indication in a more simple and efficient manner than has been possible heretofore. In one form, the invention supplies position indication for aircraft in relation to a point on the ground.

Various forms of remote positions indicators are known at the present time, and some of these indicators employ devices such as cathode ray tubes to give a visual indication of the angular position of a device being monitored relative to some reference axis. One typical such remote position indicator suggested heretofore utilizes magnetic coupling in effecting the indication desired, and such magnetic coupling may be produced between a transmitting coil coupled to the device being monitored and a pair of orthogonally disposed receiving coils coupled respectively to the deflection plates of the aforementioned cathode ray tube indicator.

It has been the practice in the past, when magnetically coupled remote position indicators of the types described above are employed, to energize the aforementioned transmitting coil with sinusoidal current whereby the magnetic field produced by said transmitting coil has in turn been substantially sinusoidal in nature. This characteristic of prior indicators has in turn been accompanied by the appreciable disadvantage that the receiving coils produce an ambiguous indication as to sense; and the cathode ray tube indication has comprised a substantially conventional Lissajous figure which must somewhow be interpreted by auxiliary structures, or by manipulative techniques in order to resolve the ambiguity as to sense.

Attempts have been made to avoid this ambiguity by incorporating various phase-sensitive devices into the transmitting and/or receiving portion of the device; but in general, these phase-resolving mechanisms have been extremely complex thereby appreciably raising the cost of both construction and maintenance of the overall device.

The present invention serves to obviate these difficulties, and is particularly concerned with a remote position indicator of the type employing a field in space such as a magnetic induction field which directly provides a sense indication on a visual indicator like a cathode ray tube in a more simple and much more efficient manner than has been suggested heretofore.

It is accordingly an object of the present invention to provide an improved remote position indicator which requires no direct physical contact between transmitting and receiving devices comprising said indicator.

Another object of the present invention resides in the provision of improved means for providing a sense indication in remote position indicators.

Still another object of the present invention resides in the provision of a novel transmitting and energization device for use in remote position indicators whereby sense ambiguity at a reception point is eliminated.

A further object of the present invention resides in the provision of a remote position indicating device for use in aircraft guidance and tracking which indicator is accurate, simple, and automatic in operation.

Still another object of the present invention resides in the provision of a remote position indicator capable of operating with a smaller frequency bandwidth than has been possible heretofore.

In accomplishing the foregoing objects and advantages, the present invention contemplates the provision of a remote position indicator taking the form of a transmitting coil which may be either fixed or movable, said transmitting coil being located at a position remote from a pair of orthogonally disposed receiving coils which may in turn be either movable or fixed. The receiving coils in accordance with the present invention are coupled respectively to the opposed deflection plates of a cathode ray tube indicator whereby the voltages induced in said receiving coils tend to so deflect the cathode ray beam as to give an indication of the relative magnitudes of said voltages induced in said receiving coils. The transmitting coil in turn is energized by a substantially saw-tooth wave shaped current source and, as will become apparent from the subsequent description, this particular waveform of energization, when applied to the transmitting coil, induces such voltages into the receiving coils as to give a positive sense indication of the angular position of the transmitting coil relative to the receiving coils.

As a result, when the angular position of the transmitting coil, relative to the receiving coils, changes due to movement of the transmitting coil relative to the receiving coils or vice versa, this change in relative angular position is in turn interpreted by a change in the cathode ray tube indication.

The foregoing objects, advantages, construction and operation of the present invention will become more readily apparent from the following description and accompanying drawings, in which:

FIGURE 1 is a schematic diagram illustrating a typical remote position indicator constructed in accordance with the present invention.

FIGURES 2A and B are waveform diagrams illustrating the operation of the circuit shown in FIGURE 1.

FIGURE 3 is a schematic diagram illustrating one possible circuit which may be employed in the production of a substantially sawtooth energization current in accordance with the present invention.

FIGURE 3A is a waveform diagram illustrating the waveform generated by the circuit of FIGURE 3.

FIGURE 4 illustrates the application of the remote position indicator of the present invention in providing a meter indication at a remote point; and FIGURE 5 illustrates an application of the present invention in providing aircraft guidance.

Referring now to FIGURE 1, it will be seen that, in accordance with the present invention, a remote position indicator may comprise a transmitting coil 10 energized by a current source 11 producing a substantially sawtooth-shape waveform. The said coil 10 may be mounted upon a shaft 12 whereby rotation of said shaft 12, due to corresponding changes in a parameter being monitored, effects a similar rotation of coil 10 thereby to change the plane of coil 10. The device also includes a pair of receiving coils 13 and 14 orthogonally disposed with respect to one another at a position remote from that of transmitting coil 10; and the said receiving coils 13 and 14 may be fixed in position. The assembly of transmitting coil 10 and receiving coils 13 and 14 is such that the plane of coil 10 is, in one position of its rotation, substantially parallel to the plane of coil 14 and orthogonal to that of coil 13; and so that the plane of coil 10 in another position of its rotation, 90-degrees to the first mentioned position, is substantially parallel to the plane of receiving coil 13 and orthogonal to that of receiving coil 14. Receiving coil 13 is coupled via an amplifier 15 to a pair of oppositely disposed deflection plates 17—18 in a cathode ray tube 21; and the receiving coil 14 is similarly coupled via a further amplifier 16 to a pair of oppositely disposed deflection plates 19—20 in said cathode ray tube 21. The two sets of deflection plates 17—18 and 19—20 are, as indicated in FIGURE 1 and as is conventional, placed at right angles to one another.

The operation of the circuit thus illustrated in FIGURE 1 will become readily apparent from an examination of the waveforms shown in FIGURES 2A and 2B. Inasmuch as transmitting coil 10 is energized by a current source 11 of sawtooth waveform, this sawtooth current circulating through the said coil 10 will in turn cause a magnetic field, also of sawtooth nature, to be produced; and the said magnetic field produced by transmitting coil 10 will expand and collapse substantially in accordance with the sawtooth energization applied to coil 10. For purposes of illustration, let us initially assume that the transmitting coil 10 is so oriented as to be positioned in a plane substantially parallel to the plane of receiving coil 14 (this particular position having been adopted in the illustration of FIGURE 1). For this position, any field produced by coil 10 will not link receiving coil 13, wherefore no voltage will be induced in said receiving coil 13; and we can therefore confine our initial attention to the effect of the transmitted field as interpreted by receiving coil 14.

Due to the sawtooth energization produced by source 11, the magnetic field transmitted by coil 10 will tend to expand rather slowly (as at 23 in FIGURE 2A), and will thereafter tend to collapse rapidly (as at 24 in FIGURE 2A); and this slow expansion and rapid collapse of the field will be repeated cyclically, as determined by the repetition rate of the source 11. The slowly expanding field produced by portion 23 of the sawtooth current energization will induce a relatively small steady state voltage 25 (see FIGURE 2B) in receiving coil 14, whereafter the rapidly collapsing portion 24 of the transmitted field will induce a large voltage pulse 26, of opposite polarity to voltage portion 25, in said receiving coil 14. The waveform of voltage induced in coil 14, therefore, is modified to assume the configuration shown in FIGURE 2B; and this waveform is characterized by a succession of voltage pulses having a relatively large magnitude in one direction interspersed with other voltage pulses of smaller magnitude in the other direction.

The voltage thus induced in coil 14 is, as mentioned previously, amplified by amplifier 16 and thereafter applied to deflection plates 19—20 of cathode ray tube 21. Since no D.C. reference level is present, the A.C. zero base line is selected to be the undeflected cathode ray beam spot of the cathode ray tube positioned at the center of the cathode ray tube screen. Application of the amplified voltage waveform shown in FIGURE 2B to the deflection plates 19 and 20 will therefore cause a pattern, illustrated at 22 in FIGURE 1, to appear on the face of the cathode ray tube; and this pattern is characterized by a relatively long sweep in one direction (produced by the pulses 26) and a much shorter sweep of higher brightness in the opposite direction (produced by the pulse portions 25).

Summarizing, therefore, it will be seen that in the absence of a transmitted waveform, the display on the face of cathode ray tube 21 will take the form of a spot located in the center of the screen. Under the conditions described, however, i.e. when coil 10 is disposed substantially parallel to coil 14 and said coil 10 is energized by a sawtooth wave-shaped electric current, the display will comprise an elongated line 22 which actually points in a single upward direction.

As will be appreciated by those skilled in the art, rotation of coil 10 through 180-degrees will cause the device to operate in a manner analogous to that already described, with the exception that the longer portion of the display 22 will be rotated through 180 degrees, whereby the pointer indication will be in a downward direction. Moreover, if the plane of coil 10 should be rotated so as to be parallel to that of receiving coil 13, the display indication 22 on the face of cathode ray tube 21 will lie in a horizontal direction and will point either to the right or to the left depending upon the direction of rotation of transmitting coil 10 relative to that of receiving coil 13.

At any intermediate angle of the transmitting coil 10, between exact parallelism with one or the other of receiving coils 13 and 14, a voltage will be induced in both of the said coils 13 and 14, and the voltage so induced in these receiving coils will be in direct proportion to the cosine of the angle between the plane of transmitting coil 10 and the corresponding planes of receiving coils 13 and 14. By way of example, at an angle of 45 degrees between the transmitting coil 10 and each of the receiving coils 13 and 14, equal energy will be picked up by the receiving coils 13 and 14; and, since the signals thus induced in the said coils 13 and 14 are of the same frequency and phase, the resultant display on the face of cathode ray tube 21 will still be a straight line pointing this time at 45 degrees to the pairs of deflection plates described previously.

It should be noted that despite the fact that the induced voltage in the receiving coils 13 and 14 is proportional to the cosine of the angle between the transmitting and receiving coils, the length of the resultant line 22 on the cathode ray tube screen will not vary as the transmitting coil 10 rotates. With proper phasing of the receiving coils 13 and 14, with respect to the location of the deflection plates 17 through 20, the display line 22 will always follow exactly the rotation of the transmitting coil 10, and this display will always have the sense indication described above characterized by a short, bright line portion in one direction with a much longer, less bright, pointer line portion in the opposite direction. By applying proper calibration to the face of cathode ray tube 21, therefore, the actual rotation angle of transmitting coil 10 can be accurately and instantaneously determined directly from the face of tube 21.

It will be appreciated that the structure and operation thus described has a number of significant advantages over remote position indicators suggested heretofore. A particular advantage, of course, resides in the simple method of obtaining a sense indication of the display line 22; and the indication is not bidirectional, with the resultant ambiguity which was characteristic of prior devices, but is immediately unidirectional resulting in a positive interpretation of the position of a transmitting device without the necessity of complex phase responsive devices and/or manipulative procedures which were necessary heretofore to achieve such a sense indication. Another advantage of the device is, of course, that no mechanical linkage need be applied to the transmitting device; and the transmitting coil can in fact be fastened to a device under test or may be formed as an integral part of that device, while the receiving coils in turn may be located at almost any reasonable distance from the transmitting device itself.

A still further advantage of the invention is that only a very small frequency bandwidth is required to obtain remote position information. Two channels, each one octave in any frequency range, even as low as ten cycles, can be used; and these two channels can be modulated as two subcarriers of a radio transmitter, if desired, thereby permitting the indicator to be readily employed in aircraft or guided missile applications.

Various forms of sawtooth generators are known to those skilled in the art, and any such generator may, if desired, be employed in providing the energization of the transmitting coil. One form of generator which has been found to operate quite well is illustrated in FIGURE 3; and this particular form of generator comprises a sine-wave source 28 connected in series with a D.C. source 29, and with a current limiting resistor 30 in series with the primary winding of a transformer 31. Transformer 31 includes a core of saturable material which is adapted to saturate fairly easily, and the D.C. source 29 is provided to effect a saturation current through the primary winding of transformer 31.

It will be appreciated, of course, that the said source 29 may, if desired, be coupled to the secondary coil or to a separate saturating winding on the core of transformer 31 rather than in series with source 28. As a result of the saturation effected by D.C. source 29, one half-cycle of the magnetic field produced in the secondary winding of transformer 31, upon application of the sinusoidal voltage from source 28, is partially suppressed thereby producing an output waveform across the transformer secondary having an even harmonic content. This particular output wave form is illustrated in FIGURE 3A and resembles a saw tooth wave whereby the said waveform may, as illustrated in FIGURE 3, be applied to the transmitting coil 10 to effect the operation already described in reference to FIGURES 1 and 2.

One particular application of the present invention involves its use in telemetering the angular displacement of a D.C. milliammeter coil; and such use is illustrated in FIGURE 4. In particular, it will be noted that a D.C. milliammeter of conventional construction may be provided, and this meter may comprise a magnet 32, preferably of ceramic type to eliminate eddy currents, surrounded by a rotatable coil 33, adapted to measure a D.C. current applied to terminals 34, and coupled to a pointer 35 cooperating with scale 36 for giving a local indication of the value of current so measured. The overall assembly is surrounded by a field ring 37.

The milliammeter coil 33, in addition to being energized by the current being measured (applied to terminals 34), is also energized by a sawtooth current source 38 whereby said coil 33 acts not only as a measurement coil but also as a transmitting coil analogous to the coil 10 described in reference to FIGURES 1 and 3. A pair of receiving coils 39 and 40 disposed orthogonally to one another at a position remote from that of metering and transmitting coil 33 may also be provided; and, as was the case in the arrangement of FIGURE 1, the said receiving coils 39 and 40 may be individually coupled via amplifiers 41 and 42 to the opposed deflection plates of a cathode ray tube 43.

The overall device thus described in reference to FIGURE 4 operates in a manner directly analogous to that already described in reference to the arrangement of FIGURE 1; and rotation of coil 33, due to application of a current being measured at terminals 34, will not only produce a local indication on scale 36 but will also produce a unidirectional display 44 on the face of cathode ray tube 43 at a position remote from that of the meter. It will be noted that the provision of field ring 37 in the meter movement tends to decrease somewhat the overall sensitivity of the telemetering device, inasmuch as it tends to reduce the flux field coupled to the receiving coils 39 and 40. For this reason it should be made of powdered iron or be removed completely with an accompanying loss of sensitivity in the milliammeter itself. It should further be noted that while the arrangement of FIGURE 4, and for that matter the arrangements of other applications already described, have illustrated the receiving coils as being centrally located on the rotational axis of the transmitting coil, this particular relative location has been adopted only for simplicity of explanation and need not be utilized in actual practice. The receiving coils may be located either separately or together anywhere in the space around, or in a position remote from, the transmitting coil provided only that the receiving coils are so oriented with respect to the transmitting coils that the necessary sense indication can be achieved.

Still another arrangement utilizing the present invention is illustrated in FIGURE 5, and this particular arrangement shows the application of the invention in providing guidance, preferably landing guidance, for an aircraft. The principles of the arrangement shown in FIGURE 5 are identical to those already described in reference to FIGURES 1 through 4, with the exception that the changes in relative position between transmitting and receiving coils are accomplished in this case by movement of the receiving coils relative to a fixed transmitting coil rather than by movement of a transmitting coil relative to fixed receiving coils. In addition to this difference, the arrangement of the coils is such that when the aircraft is heading in the proper direction there will be only a bright spot in the middle of the CR tube screen instead of a line originating in the middle of the screen as described in the foregoing.

In particular, the arrangement of FIGURE 5 utilizes a stationary coil 50 located at a fixed position adjacent the ground 51 and disposed in a plane nearly vertical to the ground 51. Transmitting coil 50 is, as before, energized by a sawtooth wave-shaped current source 52 whereby a slowly expanding and rapidly collapsing field of the type described previously is transmitted by coil 50.

An aircraft 53 equipped for proper response to the field thus produced by transmitting coil 50, preferably includes a pair of orthogonally disposed receiving coils 54 and 55; and these receiving coils 54 and 55 are so positioned in the aircraft 53 that the plane of both said receiving coils 54 and 55 is at 90 degrees to the plane of the transmitting coil 50 when the aircraft is directly on a line 56 extending perpendicular to the center of transmitting coil 50. The said receiving coils 54 and 55 are, as before, coupled via amplifiers 57 and 58 to a cathode ray tube indicator 59 energized by an appropriate power supply (not shown) thereby to give a visual indication of the position of the aircraft relative to guidance line 56.

When the aircraft is directly on line 56 whereby the plane of both of coils 54 and 55 is directly perpendicular to the plane of transmitting coil 50, no voltage will be induced in either of receiving coils 54 or 55 and no sense indication will appear on the face of the cathode ray tube 59; and this condition will continue as the aircraft approaches the transmitting coil 50 so long as said aircraft follows line 56. This proper approach will, as discussed previously, be characterized therefore by a bright spot located in the middle of the cathode ray tube 59. If, however, the aircraft 53 should turn its nose either to the right or to the left, or up or down, from its proper approach along line 56, a trace line will appear on the face of cathode ray tube 59 which trace line points in the direction which the aircraft must turn to bring the aircraft back onto a proper approach path. The trace line will in fact, as discussed previously, be longer on one side of the center spot than on the other, and this longer line is the only one which the pilot need consider in determining the proper maneuver to be made. From the psychological standpoint, this form of indication has been found to have a marked advantage. The pilot imagines that he is connected to a point on the ground with a luminous cord. This cord ends in the middle of the CR tube screen. If he is directly in line with it, only the end is visible in the form of a bright spot. Turning in any direction exposes more or less of the side of the bright cord; and the more he has turned the longer seems the cord. An inborn sense of direction enables even an untrained person to navigate the aircraft down along the luminous cord.

This guidance system exhibits an accuracy of indication that increases as the distance between the receiving coils and the transmitting coil is reduced. For example, when the aircraft is at a great distance from the transmitting coil, the amplitude of the received signal will be small and therefore a large turn off the guidance line will produce a small indicating line on the cathode ray tube. As the aircraft moves closer to the transmitting coil, the signal received will have greater amplitude and a small turn off the guidance line will produce a long line indication on the cathode ray tube.

Line 56, it will be appreciated, actually comprises one of the lines of force of the magnetic field generated by transmitting coil 50; and as a practical matter, there are a substantially infinite number of lines of force emanating from transmitting coil 50 in all directions. One additional such line of force has in fact been illustrated at 60. If the aircraft should pick up and follow any of these lines of force transmitted by coil 50, the aircraft will, of course, always end up at the position of coil 50. Thus, so long as the pilot of the aircraft maintains a center spot on cathode ray tube 59 he can always be assured of arriving at a particular destination. As a practical matter, however, and particularly when the system of FIGURE 5 is to be employed for landing guidance, some of the lines of force transmitted by coil 50 may require a too rapid descent. For this reason, therefore, the aircraft 53 should be at a low altitude before commencing the magnetic guidance, and attention must be paid to the angle that the aircraft forms with the horizontal during the landing procedure. If the angle of approach is too steep, it indicates that the aircraft is too close to the proximity of transmitter coil 50 to negotiate a safe landing, and under such circumstances, it would be preferable for the aircraft to commence another approach along another line having a less steep angle. By noting the approximate altitude and angle of the aircraft to the horizontal, however, the pilot can always have a relatively accurate idea of his position in relation to transmitter coil 50, and so long as the altitude and angle of approach are proper for landing, the system employed in FIGURE 5 can be directly utilized to give accurate guidance information during the landing procedure. In all previous examples of the operation of this invention it is assumed that the receiving coils are within the induction field of the transmitting coil. Such operation, however, is not mandatory. A higher frequency such as 50 kc., with a properly phased 100 kc. harmonic, will allow the system to operate equally well on the radiation field of the transmitting coil several miles away.

While I have thus described preferred embodiments of the present invention, many variations will be suggested to those skilled in the art; and the foregoing discussion is therefore meant to be illustrative only and should not be considered limitative of my invention. All such modifications as are in accord with the principles described are meant to fall within the scope of the appended claims.

Having thus described my invention, I claim:

1. A telemetering device comprising transmitting coil means, receiving coil means located at a position remote from and in substantially axial alignment with said transmitting coil means, the remote relative position of said transmitting and receiving coil means being linearally variable along said axis, a substantially sawtooth energization source coupled to said transmitting coil means whereby said transmitting coil means produces a magnetic field which periodically changes relatively slowly in one direction away from a datum field level and thereafter returns relatively rapidly to said datum field level in an opposite direction, said receiving coil means being located in said field whereby said field, periodically changing in opposite directions at different rates, induces a relatively small magnitude pulse of one polarity and a larger magnitude pulse of opposite polarity in said receiving coil means, means for selectively shifting the relative angular positions of said transmitting coil means and receiving coil means in accordance with a parameter being monitored, and indicator means coupled to said receiving coil means, said indicator means including means responsive to at least said larger magnitude pulse for giving a characteristic indication of said parameter being monitored.

2. The combination of claim 1 wherein said indicator means comprises a cathode ray tube indicator.

3. The combination of claim 1 wherein said transmitting coil means is movable in position.

4. The combination of claim 1 wherein said receiving coil means comprises a substantially orthogonal pair of receiving coils movable together in angular position.

5. The combination of claim 1 wherein said transmitting coil means comprises the movable coil of a meter movement, and means for applying a further variable current to said movable transmitting coil means operative to change the angular position of said transmitting coil means relative to said receiving coil means.

References Cited in the file of this patent

UNITED STATES PATENTS

| | | |
|---|---|---|
| 2,375,227 | Hillman | May 8, 1945 |
| 2,400,641 | Hardy | May 21, 1946 |
| 2,400,791 | Tolson et al. | May 21, 1946 |
| 2,402,688 | Skurnick | June 25, 1946 |
| 2,442,310 | Polydoroff | May 25, 1948 |
| 2,578,268 | Sherwin | Dec. 11, 1951 |
| 2,712,647 | Sherwin | July 5, 1955 |
| 2,883,663 | Kessler et al. | Apr. 21, 1959 |

FOREIGN PATENTS

| | | |
|---|---|---|
| 150,747 | Great Britain | Oct. 7, 1920 |